United States Patent [19]

Mason

[11] Patent Number: 4,892,148

[45] Date of Patent: Jan. 9, 1990

[54] USE OF CHLOROUS ACID IN OIL RECOVERY

[76] Inventor: James A. Mason, P.O. Box 605, Theodore, Ala. 36582

[21] Appl. No.: 206,604

[22] Filed: Jun. 14, 1988

[51] Int. Cl.[4] .............................................. E21B 37/00
[52] U.S. Cl. ................................. 166/305.1; 166/312; 252/8.552
[58] Field of Search ..................... 166/300, 305.1, 311, 166/310, 902, 312; 423/477, 478; 252/8.551, 8.552, 8.554, 8.555, 187.21–187.24

[56] References Cited

U.S. PATENT DOCUMENTS

| | | | |
|---|---|---|---|
| 4,084,747 | 4/1978 | Alliger | 252/187.23 |
| 4,104,190 | 8/1978 | Hartshorn | 423/477 |
| 4,310,425 | 1/1982 | Key et al. | 252/187.21 |
| 4,473,115 | 9/1984 | Oakes | 166/902 |
| 4,585,482 | 4/1986 | Tice et al. | 252/187.21 |

FOREIGN PATENT DOCUMENTS 959238  12/1974  Canada .......................... 252/187.23

Primary Examiner—Bruce M. Kisliuk
Attorney, Agent, or Firm—George L. Williamson

[57] ABSTRACT

The present invention relates to the use of a mixture of a salt of lactic acid and chlorus acid as an improved bactericidal agent in flooding waters used in oil recovery operations wherein the mixture is obtained by reacting lactic acid and sodium chlorite at a temperature ranging from about 60° F. to about 80° F. The use of other acids is also disclosed.

18 Claims, 1 Drawing Sheet

USE OF CHLOROUS ACID IN OIL RECOVERY

BACKGROUND OF THE INVENTION

This invention generally relates to the use of chlorous acid for the production of chlorine dioxide in concentrations suitable for use as an oxidizing agent or bactericidal agent in various industrial processes, more particularly, as an improved bactericidal agent in flooding waters used in oil recovery operations.

Methods and/or apparatuses for preparing chlorine dioxide have been described in the prior art. Muir, in U.S. Pat. No. 4,395,341, described the use of metronidazole as an improved bactericidal agent in flooding waters used in oil recovery operations. Ratigan, in U.S. Pat. No. 4,250,144, described a generating system for chlorine dioxide for use in the water or wastewater treatment industry. Ward et., al in U.S. Pat. No. 4,013,761, described an invention for generating chlorine dioxide including a generation vessel having leak inhibiting solvent weld joints with reducing couplings. Hartshorn, in U.S. Pat. No. 4,104,190, described a system of generating chlorine dioxide from aqueous liquids containing alkali metal or alkaline earth metal chlorites, and compounds which liberate chlorine in water. Rapson et al., in U.S. Pat. No. 4,534,952, described a small scaled generator of chlorine dioxide for water treatment. Rosenblatt et al., in U.S. Pat. No. 4,504,442, described a use of chlorine dioxide gas as a chemosterilizing agent particularly involving gas impermeable surfaces of implements commonly employed in the medical sciences. Callerame, in U.S. Pat. No. 3,754,079, described a process of preparing chlorine dioxide for use in the bleaching of wood pulp, fats, oils and flour. Capuano el al., in U.S. Pat. No. 4,542,008, described an electrochemical process for producing chlorine dioxide from an aqueous solution of sodium chlorite. Hicks, in U.S. Pat. No. 4,590,057, described a process for the generation of chlorine dioxide from an aqueous solution of a metal chlorite and an oxidizing agent, preferably gaseous chlorine.

However, none of the prior art cited above discloses the unique method of preparing chlorine dioxide from chlorous acid for use in oil recovery operations as does the present invention.

SUMMARY OF THE INVENTION

Oil which remains underground in porous rock formations cannot be recovered by conventional oil pumping methods. Therefore, oil companies have resorted to a process of recovery generally referred to as "secondary oil recovery" which consists of forcing flood waters down one or more wells into the porous earth formation at high pressure. Such water forced through one or more wells displaces the remaining oil from the pores of the earth formation and thereafter the oil is recovered at other well locations adjacent to or some distance from the site of the water injection well. A problem associated with "secondary oil recovery" processes is the growth of microorganisms in both the injection water system and the oil bearing earth formation. These microorganisms are of many types and may be either anarobic or aerobic in nature. One of the primary objectives and advantages of the present invention is that it allows for the introduction of an anti-bactericidal agent in the injection water system to rid both the injection water system and the oil bearing earth formation of all types of known microorganisms occuring therein whether they be aerobic or anarobic.

Furthermore, hydrogen sulfide is frequently produced in the water injection system and/or the oil bearing earth formation; and, the present invention provides a method of eliminating this problem by oxidizing the hydrogen sulfide and/or killing the microbes which produce it.

One of the primary objectives and advantages of the present invention is that it allows for the formation of chlorous acid in an aqueous solution using bulk quantity reactants which allows for the production of a source of the chlorine dioxide off site rather than on-site at the particular industrial installation of importance. Off site production is important because it allows for a much safer generating process for chlorine dioxide whereby the risk of fire and explosion are minimized. It is anticipated that the chlorous acid would be shipped to the plant site by, e.g., tank truck or railway tank car. Furthermore, the present invention allows for the mixing and formation of the chlorine dioxide in an aqueous solution involving bulk quantities and mixing ratios which are extremely simple and basic whereby more or less generally lesser-trained personnel can accomplish the production of the chlorine dioxide. This method allows for the delivery of a source of chlorine dioxide to a plant site by merely transporting an aqueous solution by a refrigerated means which is not now done because chlorine dioxide can be not be safely transported and therefore is now generally generated on-site.

According to the invention there is provided a method of forming chlorous acid in an aqueous solution from the reaction of lactic acid or citric acid with sodium chlorite to yield a salt of the acid and chlorous acid. This reaction is carried out at a pH $<7$ and at a temperature of $<80°$ F., in the range of approximately, 60°F. to 80° F. The aqueous solution of chlorous acid formed from the aforementioned reaction is stable and can be safely transported by common carrier, e.g., tank truck or railway tank car, to the plant site. Normally the aqueous solution of chlorous acid, the mixing of which has previously been described, would be injected into the flood waters used in the oil recovery process prior to the injection of the flood waters into the earth bearing formation.

The aforementioned reaction is the first of a chain or reactions leading to the production of chlorine dioxide which eventually leads to treatment and disinfection of waters used in the oil recovery process. These further reactions, generally, involve the oxidation of various organic compounds or destruction of pathogens or microorganism by either chlorous acid, chloric acid, chlorine dioxide or chlorine gas, or, a mixture of these chemical constituents, and will be further described by use of chemical equations in the following section of this specification.

Note that it may be feasible to substitute other alkali metal or alkaline earth metal chlorites for sodium chlorite referred to in this specification. Further note, it may be feasible to substitute other organic hydroxy acids and carboxylic acids for the lactic acid previously mentioned in this specification. For example, acids which may be substituted may include citric, malic, glycolic, and tartaric acid,

DESCRIPTION OF USE OF CHLOROUS ACID IN OIL RECOVERY

Figure 1:
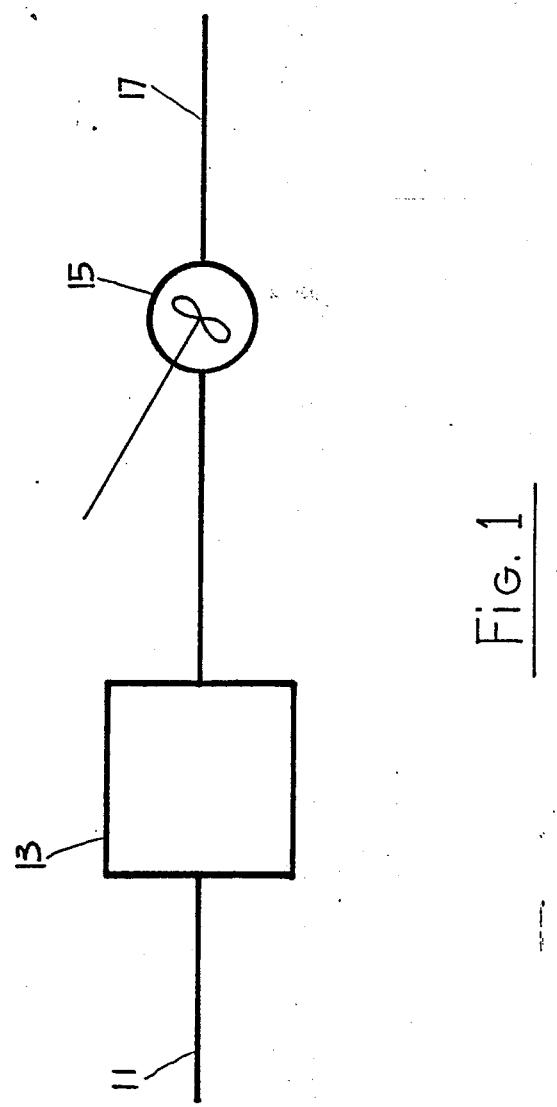
FIG. 1 is a schematic representation of one exemplary process of using the present invention.

A more detailed description of the present invention follows in the form of chemical equations and examples.

The reactions utilized in the method of the present invention are as follows:

1. $$CH_3CH(OH)COOH + NaClO_2 \longrightarrow CH_3CH(OH)COONa + HClO_2$$
(lactic acid) + (sodium chlorite) → (salt of lactic acid) + (chlorous acid)

Citric acid, $HOC(CH_2COOH)_2COOH$, may be substituted for Lactic Acid. Also, malic, tartaric and glycolic acid may be substituted for lactic acid.

2. 
a. $HClO_2$ (chlorous acid) + Non Fully Oxidized Organics or Inorganics $\longrightarrow$ $HClO$ + Oxidized Organics or Inorganics (Hypochlorus acid)

b. $2HClO_2 \longrightarrow HClO + HClO_3$
(chlorous acid) (Hypochlorus acid) (chloric acid)
(This reaction occurs in absence of chloride ion)

This reaction 2.b. is not desirable, but it will occur simultaneously with reaction 3., but not necessarily at the same rate.

3. $$HClO + 2HClO_2 \rightarrow 2ClO_2 + H_2O + HCl$$

(This reaction occurs in absence of chloride ion)

4. $ClO_2$ + Non Fully Oxidized Organics or Inorganics $\longrightarrow HClO_2$ + Oxidized Organics or Inorganics Reaction 3. provides chloride ions, therefore the following reaction occurs:

5. $$HClO + Cl^- + H^+ \rightleftharpoons Cl_2 + H_2O$$

The Chlorine reaction with organics or inorganics is generally thought to be primarily an Oxidation as follows:

6. $Cl_2$ + Organics or Inorganics $\longrightarrow$ Oxidized Organics or Inorganics The above reactions are carried out at a pH less than 7.

It is believed that the microbe killing mechanism of the present invention is due to chlorous acid, chloric acid, chlorine dioxide or chlorine gas, or, a mixture of these chemical constituents.

In practice, the reactants and reactions are produced by mixing bulk quantities of sodium chlorite and lactic acid. In practice, three parts of sodium chlorite at a concentration of 26% by volume are mixed with one part of lactic acid at a concentration of 88% by volume which is a food grade of lactic acid. The 26% by volume of sodium chlorite and 88% by volume of lactic acid are commonly commercially available bulk quantities of these compounds and are generally provided to industry commercially in either drum lots or bulk quantities for example tank cars or tank trucks. Furthermore, note in the above reaction Number 1. that citric acid, $HOC(CH_2COOH)_2COOH$, may be substituted for the lactic acid to produce a salt of citric acid and chlorous acid in an aqueous solution along with the other acids previously mentioned.

The above reaction Number 1. is accomplished by mixing the reactants together at atmospheric pressure in an aqueous solution with the water temperature being approximately 62° F. being in the range of 60° F. to 80° F. The higher water temperatures nearing 80° F. can be used if necessary to increase the reaction speed. Higher water temperatures may be feasible.

The aqueous solution resulting from reaction number 1 above has a density of about 1.0039, a boiling point of about 101.6° F., a freezing point of about −3° C. and a pH of approximately 4.7. The solution is completely missable in water, has a punjent odor resembling chlorine and a color of clear to slightly amber.

As can be seen, the results of the present invention can be accomplished by easily mixing on a part to part basis commonly available commercial products in commonly available commercial quantities so as to produce the desired reactions. Granulated sodium chloride can also be used to make up the bulk quantity of this aqueous solution.

It is expected that the aqueous solution containing the chlorous acid would normally be injected into the flood water prior to it being pumped into the oil bearing earth formation.

The above reactions produces aqueous solutions containing very high concentrations of chlorine dioxide ranging from generally 5000 ppm to 80,000 ppm. Furthermore, the chlorine dioxide produced by the present invention appears to have more oxidizing and microbe destroying power on a per unit basis than chlorine dioxide produced by other methods.

The invention will now be described by several examples, it being understood, however, that these examples are given by way of illustration and not by way of limitation in that many changes may be effected without affecting in anyway the scope and spirit of this invention as recited in the appended claims.

EXAMPLE 1

The reaction was carried out using one 55 gallon drum by volume of lactic acid at 88%, i.e., food grade, and three 55 gallon drums of 26% sodium chlorite by volume to yield the desired reactions.

The lactic acid and sodium chlorite were first mixed in a large vessel of water having a temperature of approximately 62° F. being at atmospheric pressure.

EXAMPLE 2

Turning to FIG. 1, one exemplary process schematic for using the present invention to treat or disinfect waters used in the oil recovery process is shown. At 11, the influent to the oil recovery process is shown with the process being, 13, a mixing vessel, 15, is shown being the point where injection of the aqueous solution normally occurs.

The effluent discharge is shown at 17. Normally, the aqueous solution containing the chlorous acid would be injected at the mixing vessel, 15. Thereafter, the flood waters are injected into the underground oil bearing earth formation in the water injection system through one or more wells.

EXAMPLE 3

A granulated Sodium Chlorite was dissolved in water to form a 48% sodium cholite solution according to standard published data on solubility of Sodium Chlorite. This solution was then combined with a solution of 88% lactic acid. An immediate reaction occurred forming a deep brown solution. This solution was tested and the presence of $ClO_2$ was detected. No attempt was made to ascertain the $ClO_2$ ppm of this solution.

EXAMPLE 4

The same steps were taken as in Example 3 using 2 parts sodium chlorite, 1 part lactic acid, 4 parts water at approximately 60° F. Again the reaction showed the presence of $CLO_2$ after reaction in a closed vessel for approximately 30 minutes.

EXAMPLE 5

The same steps were used as in Example 4 except the water was heated to a maximum temperature of approximately 120° F. The reaction appeared to take place much faster.

EXAMPLE 6

A commercially available 26% solution of sodium chlorite was used with 88% lactic acid solution on a one to one basis. The same reaction was observed as in Example 3.

EXAMPLE 7

Same as Example 6, except 2 parts sodium chlorite 26% to 1 part lactic acid to 10 parts water at approximately 60° F. This formed a solution containing Chlorine Dioxide in excess of 80,000 ppm according to accepted tests.

EXAMPLE 8

Same as Example 7, except 2½ parts of sodium chlorite 26% was used to 1 part lactic acid to 10 parts water at approximately 60° F. with approximately the same results as Example 7.

EXAMPLE 9

Same as Example 8, except 3 parts sodium chlorite 26% to 1 part lactic acid 88% to 50 parts water at 60° F. This solution formed a solution containing 5000 plus or minus ppm $ClO_2$.

EXAMPLE 10

A storage test was conducted where solutions were placed in 12 oz. amber bottles and capped. ⅓ were stored out of sunlight at approximately 72° F., ⅓ placed outside was exposed to sunlight and varying temperatures. ⅓ was placed in refrigerator at approximately 38° F.

Tests were conducted to determine loss of concentration and as expected the solution placed outdoors was the most unstable. The solution at 72° retained its concentration to within 2% plus or minus for at least 60 days at which time tests were discontinued.

The refrigerated solutions tested the same as the ones stored at 72° indoors, and were retained up to 120 days at which time sample tests were discontinued.

EXAMPLE 11

Tests were conducted to determine if larger quantities could be commercially produced.

3 gals of 26% sodium chlorite, 1 gal of 88% lactic acid, 51 gal/water in 55 gal. drums, were combined using the following steps; (1) a 55 gal. drum was filled approximately ⅓ full with water and 1 gal 88% lactic acid added and agitated to mix; (2) 3 gals 26% sodium chlorite added and agitated; (3) drum was then filled with water and capped for 15 minutes; (4) drum uncapped and tested and found to contain $ClO_2$ at 5000 ppm plus or minus 2%.

EXAMPLE 12

Same as Example 11 except 6 gal/sodium chlorite, 2 gals/lactic acid and 47 gals/water were combined to produce a solution containing 10,000+ppm $ClO_2$.

EXAMPLE 13

Same as Example 11 except 8 gals/sodium chloride, 2½ gals/lactic acid, 44½ gal/water were combined. Test showed 1800 plus or minus 2% ppm $CLO_2$.

It was found that a solution of 10,000 ppm may be stored in drums without loss of appreciable concentrations up to 90 days.

EXAMPLE 14

Tests were conducted in a Northwest Florida potable surface water treatment facility. The facility treats an average of 16 MGD. A 55 gal drum of approximately 5000 ppm $ClO_2$ solution was used and fed into the system prior to flocculation, at a rate of 1 gal solution per million gal water.

Samples were taken and tested on site and also by a certified water testing laboratory. The results showed 0 total coliforms, trihalomethane production was below detection level, and no chlorites or chlorates were detectable in the samples taken.

We have found the most desirable concentration for the treatment of potable water to 5000 ppm $ClO_2$ due to ease of handling and effectiveness of product as a disinfectant.

EXAMPLE 15

Grab samples were taken from a large Southwestern city potable (surface water) water filtration system. The samples were treated by applying 5000 ppm $ClO_2$ solution to the water in the following part to part ratios: ½ gal solution per million gals water; 1 gal solution per million gals water; and, 2 gal. solution per million gals. water.

The results were the same as in Example 13 when mixing 2 gal solution per million gals water.

EXAMPLE 16

Grab samples were taken from a South Alabama municipal potable (surface water) and treated the same as in Example 14, with the same results as Example 13.

EXAMPLE 17

Tests were conducted in a small South Louisiana city. Ground wate is pumped from a depth in excess of 1500 feet. 5 wells supply the city's total water requirements. High concentrations of $H_2S$ as evidenced by the strong sulfur taste and rotten egg smell were evident. The $H_2S$ levels tested to show 5 ppm. A 55 gal. drum of 5000 ppm ClO$_2$ solution was delivered to each well location and applied to the raw water at each wellhead at a rate of 1 part solution per M.G.D. Samples of water at each location were taken periodically over a period of 30 days. Results showed complete elimination of H$_2$S taste and odor. A certified laboratory in South Louisiana test showed no adverse chemical effects in final water.

I claim:

1. In a process of oil recovery including the steps of injecting flooding waters into oil bearing subterranean formations by means of water injection wells in order to displace portions of the remaining oil therein, the improvement comprising flooding waters having therein an aqueous solution containing an effective antibacterial amount of a mixture of a salt of lactic acid and chlorous acid, wherein said aqueous solution is obtained by reacting lactic acid and sodium chlorite, wherein said reacting of said lactic acid and said sodium chlorite occurs off-site from said well prior to injection into said well, wherein thereafter said aqueous solution is delivered on-site to said well for injection, and wherein said aqueous solution is injected into said well.

2. A method as claimed in claim 1, wherein citric acid is substituted for lactic acid.

3. A method as claimed in claim 1, wherein malic acid is substituted for lactic acid.

4. A method as claimed in claim 1, wherein tartaric acid is substituted for lactic acid.

5. A method as claimed in claim 1, wherein glycolic acid is substituted for lactic acid.

6. A process according to claim 1, wherein said aqueous solution is obtained by reacting one part by volume of 88% lactic acid and 2 parts by volume of 26% sodium chlorite.

7. A process according to claim 1, wherein said aqueous solution is obtained by reacting 48% sodium chlorite at 1.8 parts by volume with 3 parts 88% lactic acid.

8. A process as claimed in claim 1, wherein chlorine dioxide is formed in the flooding water having a concentration ranging from 4000 to 6000 ppm.

9. A process as claimed in claim 7, wherein chlorine dioxide is formed in the flooding water having a concentration ranging from 4000 to 6000 ppm.

10. A method as claimed in claim 1, wherein the reaction of lactic acid and sodium chlorite occurs at a temperature ranging from about 60° F. to about 80° F.

11. A method as claimed in claim 10 wherein citric acid is substituted for lactic acid.

12. A method as claimed in claim 10, wherein malic acid is substituted for lactic acid.

13. A method as claimed in claim 10, wherein tartaric acid is substituted for lactic acid.

14. A method as claimed in claim 10, wherein glycolic acid is substituted for lactic acid.

15. A process according to claim 10, wherein said aqueous solution is obtained by reacting one part by volume of 88% lactic acid and 2 parts by volume of 26% sodium chlorite.

16. A process according to claim 10, wherein said aqueous solution is obtained by reacting 48% sodium chlorite at 1.8 parts by volume with 3 parts 88% lactic acid.

17. A process as claimed in claim 10, wherein chlorine dioxide is formed in the flooding water having a concentration ranging from 4000 to 6000 ppm.

18. A process as claimed in claim 16, wherein chlorine dioxide is formed in the flooding water having a concentration ranging from 4000 to 6000 ppm.

* * * * *